United States Patent [19]

Rocci et al.

[11] Patent Number: 4,494,111

[45] Date of Patent: Jan. 15, 1985

[54] FREQUENCY AGILE SECURITY APPARATUS

[75] Inventors: Joseph D. Rocci, Lansdale; Stephen E. Crook, Horsham; Marc Kauffman, Elkins Park, all of Pa.

[73] Assignee: General Instrument Corporation, New York, N.Y.

[21] Appl. No.: 328,301

[22] Filed: Dec. 7, 1981

[51] Int. Cl.³ .......................... G08B 1/08; H04N 1/00

[52] U.S. Cl. .................................... 340/533; 340/505; 340/531; 340/825.08; 340/825.54; 455/3; 358/86; 375/36

[58] Field of Search ............... 340/533, 531, 532, 518, 340/505–507, 536, 825.21, 825.06–825.13, 825.29, 825.52, 825.54, 870.09, 870.16, 870.18, 870.25; 179/5 R, 5 P; 178/63 R, 63 A, 63 B, 63 C; 358/10, 139, 122, 86; 375/36, 7; 455/3–6, 9, 14, 15, 17, 63, 20

[56] References Cited

U.S. PATENT DOCUMENTS

| | | | |
|---|---|---|---|
| 3,742,452 | 6/1973 | Audretsch et al. | 340/825.54 |
| 3,761,914 | 9/1973 | Hardy et al. | 340/533 |
| 3,803,491 | 4/1974 | Osborn | 340/825.54 |
| 4,066,966 | 1/1978 | Takeuchi et al. | 340/310 R |
| 4,075,628 | 2/1978 | Masuda et al. | 358/86 |
| 4,114,150 | 9/1978 | Yamazaki et al. | 340/531 |
| 4,245,245 | 1/1981 | Matsumoto et al. | 358/122 |
| 4,408,345 | 10/1983 | Yashiro et al. | 340/825.08 |

*Primary Examiner*—Donnie L. Crosland
*Attorney, Agent, or Firm*—Allan Jacobson

[57] ABSTRACT

A cable TV security system utilizes three radio frequency signals as three data communication channels: one downstream channel and two upstream channels. A headend alarm processor transmits system commands on the downstream channel. A plurality of subscriber alarm units, connected to the cable TV system, transmit messages on the upstream channels to the headend alarm processor. The respective center frequency of both upstream channels is selectable by command on the downstream channel transmitted from the headend. In the event that one subscriber's alarm unit malfunctions whereby a continuous stream of upstream transmission jams one of the upstream channels, the headend alarm processor changes the respective transmitter frequency of the remaining subscriber alarm units to a clear channel frequency. Alternatively, the frequency or frequencies of the malfunctioning unit may be changed. In either case, system security coverage is rapidly restored.

6 Claims, 15 Drawing Figures

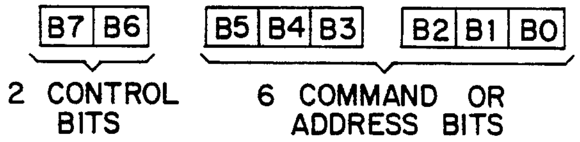
FIG-2
| | B7 | B6 | B5 — B0 |
|---|---|---|---|
| W0 | 0 | 0 | LOWER 6 BITS OF 18 BIT SUBSCRIBER ADDRESS |
| W1 | 0 | 1 | MIDDLE 6 BITS OF 18 BIT SUBSCRIBER ADDRESS |
| W2 | 1 | 0 | UPPER 6 BITS OF 18 BIT SUBSCRIBER ADDRESS |
| W3 | 1 | 1 | COMMAND CODE |
FIG-4
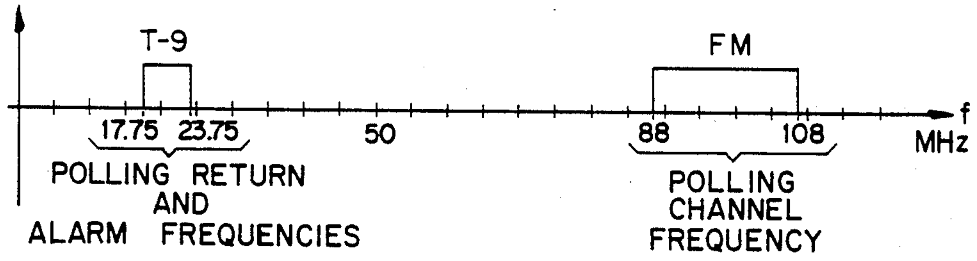

GLOBAL COMMANDS: [3 | X | X] W3

FIG-5

| CODE | NAME | OPERATION |
|---|---|---|
| 377 | INTER-RECORD GAP (IRG) | SYNCHRONIZING SIGNAL |
| 367 | ALL QUIET | STOP UPSTREAM TRANSMISSION ON ALARM CHANNEL |
| 353 | ALL SPEAK AGAIN | REQUEST UPSTREAM TRANS-MISSION ON ALARM CHANNEL |
| 354 | RESTORE ORIGINAL FREQUENCY | SET POLLING RETURN AND ALARM CHANNEL FREQUENCIES AS DEFINED IN SUBSCRIBER PROM |
| 374 | ALL STAND ALONE | LOCAL ALARM ONLY, STOP UPSTREAM TRANSMISSION |
| 356 | BATTERY TEST ON | ALL OPERATE ON BATTERY |
| 357 | BATTERY TEST OFF | ALL OPERATE ON PRIMARY AC |
| 376 | RESET | RESET TO INITIAL CONDITION |

FIG-6

ADDRESSABLE COMMAND: [3 | X | X] W3 [2 | X | X] W2 [1 | X | X] W1 [0 | X | X] WO

| CODE | NAME | OPERATION |
|---|---|---|
| 360 | POLLING | REQUEST ADDRESSED SUBSCRIBER TO ACKNOWLEDGE |
| 352 | ALARM VERIFIED | INFORM ADDRESSED SUBSCRIBER THAT HEADEND HAS RECEIVED ALARM MESSAGE |
| 373 | DIRECT VERIFY | REQUEST ADDRESSED SUBSCRIBER TO SEND ALARM MESSAGE ON POLLING CHANNEL |
| 375 | DISARM | TURN OFF INTRUSION ALARM |
| 355 | LEARN PRIMARY CODE | PERMIT SUBSCRIBER TO ENTER A NEW PRIMARY CODE |

FIG-7

ADDRESSABLE DATA: [3|X|X] [2|X|X] [1|X|X] [0|X|X] [X|X|X]

W3 W2 W1 W0 WX

| CODE | NAME | OPERATION |
|---|---|---|
| 364 | TUNE POLLING RETURN CHANNEL | TUNE POLLING RETURN CHANNEL FREQUENCY OF ADDRESSED UNIT TO FOLLOWING DATA WORD |
| 365 | TUNE ALARM CHANNEL | TUNE ALARM CHANNEL FREQUENCY OF ADDRESSED UNIT TO FOLLOWING DATA WORD |

FIG-8

GLOBAL DATA: [3|X|X] [-|X|X]

W3 W2 or W1 or W0 or WX

| CODE | NAME | OPERATION |
|---|---|---|
| 362 | GLOBAL TUNE ALARM CHANNEL | TUNE ALARM CHANNEL FREQUENCY OF ALL UNITS TO FOLLOWING DATA WORD |
| 366 | ADDRESS SEARCH 0 | SEND ALARM CODE IF ADDRESS MATCHES FOLLOWING ADDRESS WORD AND DID NOT MATCH PREVIOUS ADDRESS WORD |
| 363 | ADDRESS SEARCH 1 | SEND ALARM CODE IF ADDRESS MATCHES FOLLOWING ADDRESS WORD AND DID MATCH PREVIOUS ADDRESS WORD |

FIG-9

GLOBAL DATA: | 3 | X | X | | – | X | X | | X | X | X |

W3 — W2 or W1 or WO — WX

| CODE | NAME | OPERATION |
|---|---|---|
| 361 | GROUP TUNE POLLING RETURN CHANNEL | TUNE POLLING RETURN CHANNEL TO FOLLOWING DATA WORD IF ADDRESS MATCHES FOLLOWING ADDRESS WORD |

ALARM CODES: | X | X | X |

| | |
|---|---|
| 0 | INTRUSION |
| 1 | FIRE |
| 2 | USER DEFINED |
| 3 | " " |
| 4 | " " |
| 5 | " " |
| 6 | " " |
| 7 | " " |
| 20 | MEDICAL BUTTON |
| 40 | FIRE BUTTON |
| 100 | POLICE BUTTON |
| 200 | BATTERY FAILURE |
| 272 | TAMPER |
| 274 | CANCEL (SYSTEM DISARMED) |

FIG-10

NORMAL POLLING AND DIRECT VERIFY LOGIC

NORMAL POLLING AND DIRECT VERIFY SEQUENCE

FIG-14

SEARCH VERIFY SEQUENCE

| | ALARM CHANNEL | POLLING CHANNEL | POLLING RETURN |
|---|---|---|---|
| T59 | GARBLED ALARM | | |
| T60 | | 5 IRG'S | |
| T61 | | ADDRESS SEARCH 0 | |
| T62 | | 2 4 0 | |
| T63 | | 5 IRG'S | |
| T63a | | ADDRESS SEARCH 0 | |
| T64 | | 2 2 0 | |
| T65 | | 5 IRG'S | |
| T66 | | ADDRESS SEARCH 0 | |
| T67 | | 2 1 0 | |
| T68 | | ETC., UNTIL REPLY RECEIVED | ALARM CODE |
| T69 | | 5 IRG'S | |
| T70 | | ADDRESS SEARCH 1 | |
| T71 | | 2 0 4 | |
| T72 | | 5 IRG'S | ALARM CODE |
| T73 | | ADDRESS SEARCH 1 | |
| T74 | | 2 0 2 | |
| T75 | | ETC., UNTIL NO REPLY RECEIVED | |
| T76 | | 5 IRG'S | |
| T77 | | ADDRESS SEARCH 0 | |
| T78 | | 2 0 1 | |
| T79 | | 5 IRG'S | |
| T80 | | ADDRESS SEARCH 0 | |
| T81 | | 1 4 0 | |
| | | ETC. FOR REMAINING ADDRESS BITS | |

FREQUENCY AGILE SECURITY APPARATUS

FIELD OF THE INVENTION

This invention relates to security apparatus utilizing two way cable TV systems for transmitting alarm messages to a central location.

BACKGROUND OF THE INVENTION

A security system utilizing a cable TV communications system is disclosed in a pending patent application entitled "Security System", by Tom O'Brien, Ser. No. 328,304 filed Dec. 7, 1981, which application is assigned to the assignee of the present invention. The latter patent application describes an alarm system utilizing three radio frequency signals as data communication channels between a headend alarm processor and a plurality of subscriber alarm processors. One channel is a polling channel on which the headend alarm processor transmits command messages to all subscriber units. Another channel is a polling response channel on which an addressed subscriber unit responds to a headend command message. The third channel is an alarm channel on which subscriber units transmit alarm messages to the headend essentially when a respective alarm condition is first detected.

Thus, a security system of the type described above has one transmitter tuned to the downstream polling channel frequency, but a plurality of transmitters respectively tuned to either the upstream polling return frequency or alarm channel frequency. If one of the plurality of subscriber alarm units should fail in a mode wherein a continuous transmission is coupled to the cable system, then one or both of the polling return channel or alarm channel will be jammed, thereby disabling the entire security system.

In a security system, continuity of security coverage is of great importance. When a system failure does occur, the system must be restored to proper operation quickly so that theres no significant interruption in security coverage.

On prior art solution to the above described jamming problem is to use a radio frequency (RF) signal sensor coupled to a switching circuit on the output of each subscriber transmitter. If the RF signal output from any subscriber unit is continuous, i.e. if rf transmission exceeds a predetermined time duration such as 10 milliseconds, then the switching circuit is rendered operative, effectively preventing the output of the subscriber's transmitter from entering the cable system.

Another prior art solution to the jamming problem is available in cable systems utilizing bridger amplifiers with bridger switches that are controllable from the headend.

Bridger amplifiers connect trunk lines to local feeder lines. Within the bridger amplifier, there is a return amplifier (i.e. a 5 to 30 MHZ amplifier which propagates signals in the reverse direction). The return amplifier includes a bridger switch that is controllable from the headend for disabling the bridger return amplifier.

When a jamming signal is detected at the headend, succesive bridger amplifier switches throughout the cable system are opened under headend control until the jamming signal is eliminated. Then all bridger switches are enabled except for the bridger switch corresponding to the feeder line containing the jamming subscriber unit.

However, a portion of the subscribers on the effected feeder line, i.e. downstream of the activated bridger switch are without security coverage. Moreover, the specific location of the jamming subscriber unit must be determined by manually checking the cable system in the field.

SUMMARY OF THE INVENTION

The present invention is embodied in a security apparatus responsive to commands from the cable system headend for changing the respective frequency of the upstream channels, i.e. polling return channel and the alarm channel.

Thus, when one subscriber unit malfunctions, causes a jamming signal, the transmitter frequency of each respective remaining subscriber unit, responsive to headend commands, changes to a clear channel frequency. Alternatively, the transmitter frequency of the subscriber unit causing the jamming signal changes to another frequency responsive to headend commands, thereby leaving the remaining subscriber units on a clear frequency.

Therefore, the security system is rapidly returned to operational condition so that interruption in security coverage is reduced. Furthermore, the subscriber apparatus that caused the jamming signal is known at the headend so that the malfunctioning unit may be located without further field testing.

BRIEF DESCRIPTION OF DRAWINGS

In the Drawings:

FIG. 2 shows the data word format used in the system of FIG. 1;

FIG. 3 illustrates various communication signals in the time domain utilized in the system of FIG. 1, wherein FIG. 3*a* is the system clock, FIG. 3*b* is the data word format, FIG. 3*c* is the data frame format, FIG. 3*d* is a Manchester encoded data frame, and FIG. 3*e* is the frequency shift keyed (FSK) modulated signal;

FIG. 4 illustrates the frequency bands from which channel frequencies are assigned for the system FIG. 1;

FIGS. 5 through 9 are table listings of the commands used by the headend alarm processor to control the respective subscriber alarm processors illustrated in FIG. 1;

FIG. 10 is a table listing the alarm codes transmitted by respective subscriber alarm processors in to the headend alarm processor illustrated in FIG. 1;

FIG. 14 illustrates a typical command sequence for the program flow chart of FIG. 13;

DETAILED DESCRIPTION

Figure 1:
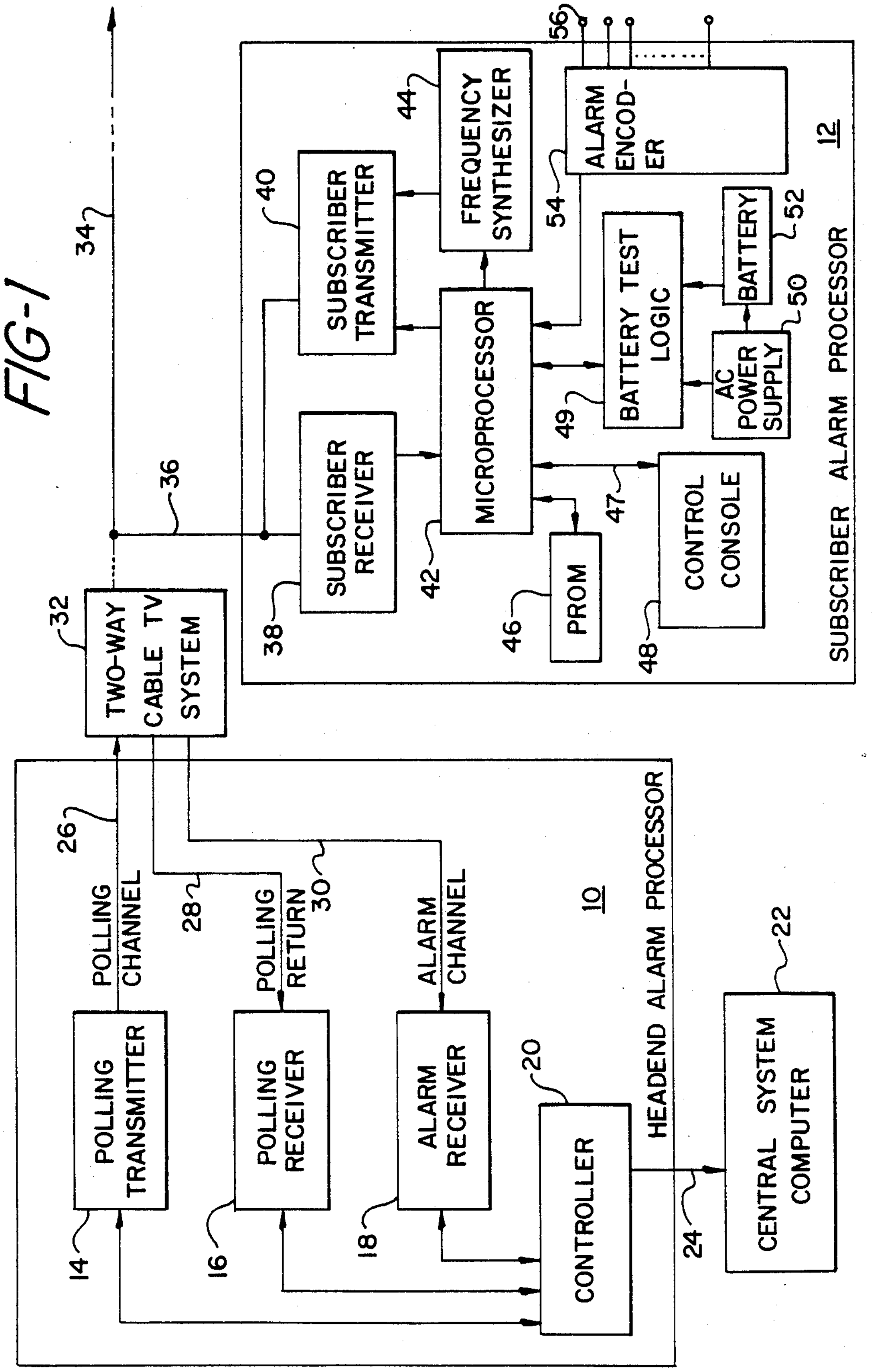
FIG. 1 is a block diagram illustrating a security system embodying the present invention.

The security system shown in FIG. 1 comprises a headend alarm processor 10, a subscriber alarm processor 12, and a cable TV distribution system 32 which provides for two way communication between the headend alarm processor 10 and the subscriber alarm processor 12.

The headend alarm processor 10 comprises a polling transmitter 14, a polling receiver 16, an alarm receiver 18, and a controller 20.

The subscriber alarm processor 12 is one of a plurality of similar subscriber alarm processors which communicate with the headend alarm processor 10 over the cable TV system 32. The subscriber alarm processor 12 is connected to an extension 34 of the cable system though a drop line 36 leading into the subscriber's premises.

In operation, individual alarms, e.g. fire, intrusion etc., are received at the respective alarm ports 56. The subscriber alarm processor 12 transmits an alarm message corresponding to the alarm received at alarm port 56 through the cable TV system 32 to the headend alarm processor 10. After receipt by the headend alarm processor 10, the alarm message is forwarded over a telephone data link 24 to a central system computer 22 where the alarm is serviced. For example, the subscriber address originating a fire alarm would be forwarded to the appropriate fire department.

Alarm messages over the cable TV system 32 are provided on three radio frequency signals, i.e. separate communications channels. One of the channels is a polling channel 26 wherein polling messages are sent from the headend alarm processor 10. The second channel is a polling return channel 28 wherein messages are transmitted from an addressed subscriber alarm processor 12 for receipt by the headend alarm processor 10 in response to a polling message. The third channel is an alarm channel 30 wherein any subscriber alarm processor 12 can initiate an alarm message for immediate transmission to the headend alarm processor 10.

The subscriber alarm processor 12 comprises a subscriber receiver 38, a subscriber transmitter 40, an alarm port encoder 54, and a microprocessor 42 for interpreting polling messages from receiver 38, and providing polling response and alarm messages to transmitter 40. The microprocessor 42 is also responsive to a control console 48 used by the subscriber and connected to the microprocessor 42 over a serial data link 47. For example, in addition to providing controls for arming and disarming the system, the control console 48 has call buttons for police, fire and medical alert which cause the microprocessor 42 to initiate a suitable alarm message to subscriber transmitter 40.

A frequency synthesizer 44 is also provided for setting the frequency of the subscriber transmitter 40 under control of the microprocessor 42. The subscriber alarm processor 12 further includes a programmable read only memory (PROM) 46 which contains data unique to each respective subscriber alarm processor (such as unique subscriber address or special customizing alarm features). PROM 46 also stores data used by the microprocessor 42 to set the original frequencies of the polling return channel 28 and alarm channel 30 through the frequency synthesizer 44.

A battery 52 is provided to back-up the AC power supply 50. Battery test logic 49 is also provided for monitoring the battery 52 to insure that the battery back-up 52 continues to be functional in the event of a primary AC power failure. In operation, the AC power supply 50 continuously recharges battery 52. If AC power fails, battery test logic switches in the battery 52 to provide power for the subscriber alarm processor 12.

The system generally operates as follows. The headend alarm processor 10 polls each of the subscriber alarm processors in sequence on the polling channel 26. Each respective subscriber alarm processor responds to its polling address by transmitting a message on the poling return channel 28. Lack of a polling response indicates a cut cable alarm.

If any subscriber alarm processor receives a local alarm on an alarm port 56, such subscriber alarm processor transmits an alarm message on the alarm channel 30 essentially when the alarm condition is first detected. An individual subscriber alarm processor forwards an alarm message once on the alarm channel 30 and then waits for verification or other instructions from the headend alarm processor 10.

The headend alarm processor 10 upon receipt of an alarm message on the alarm channel 30, suspends normal polling on the polling channel 26. The headend alarm processor 10 then directly polls the subscriber alarm processor that originated the message to verify the alarm. The addressed subscriber alarm processor then transmits its complete address and an alarm code on the polling return channel 28. After verification of the alarm, the headend alarm processor 10 will forward the alarm to the central system computer 22.

The headend alarm processor 10 has the capability to change the respective frequencies of the polling return channel 28 and the alarm channel 30, as well as to operate all subscriber units under battery power for battery test purposes, and to search for and verify the subscriber unit that originated a garbled alarm message.

Messages and commands between the headend alarm processor 10 and the subscriber alarm processor 12 are exchanged in the form of 8 bit data words. FIG. 2 shows the format for the 8 bit words. The two most significant bits, B7 and B6, designate either a command code word 11 (word 3) or an address word 10,01, or 00 (corresponding to word 2, word 1, or word 0 respectively). For word 3 messages, bits B5 through B0 correspond to one of 32 possible command codes originating from the headend. For word 2, word 1, or word 0 messages, bits B5 through B0 correspond to the respective higher order 6 bits, middle 6 bits, or lower order 6 bits of an 18 bit address for each respective subscriber alarm processor.

Figure 3:
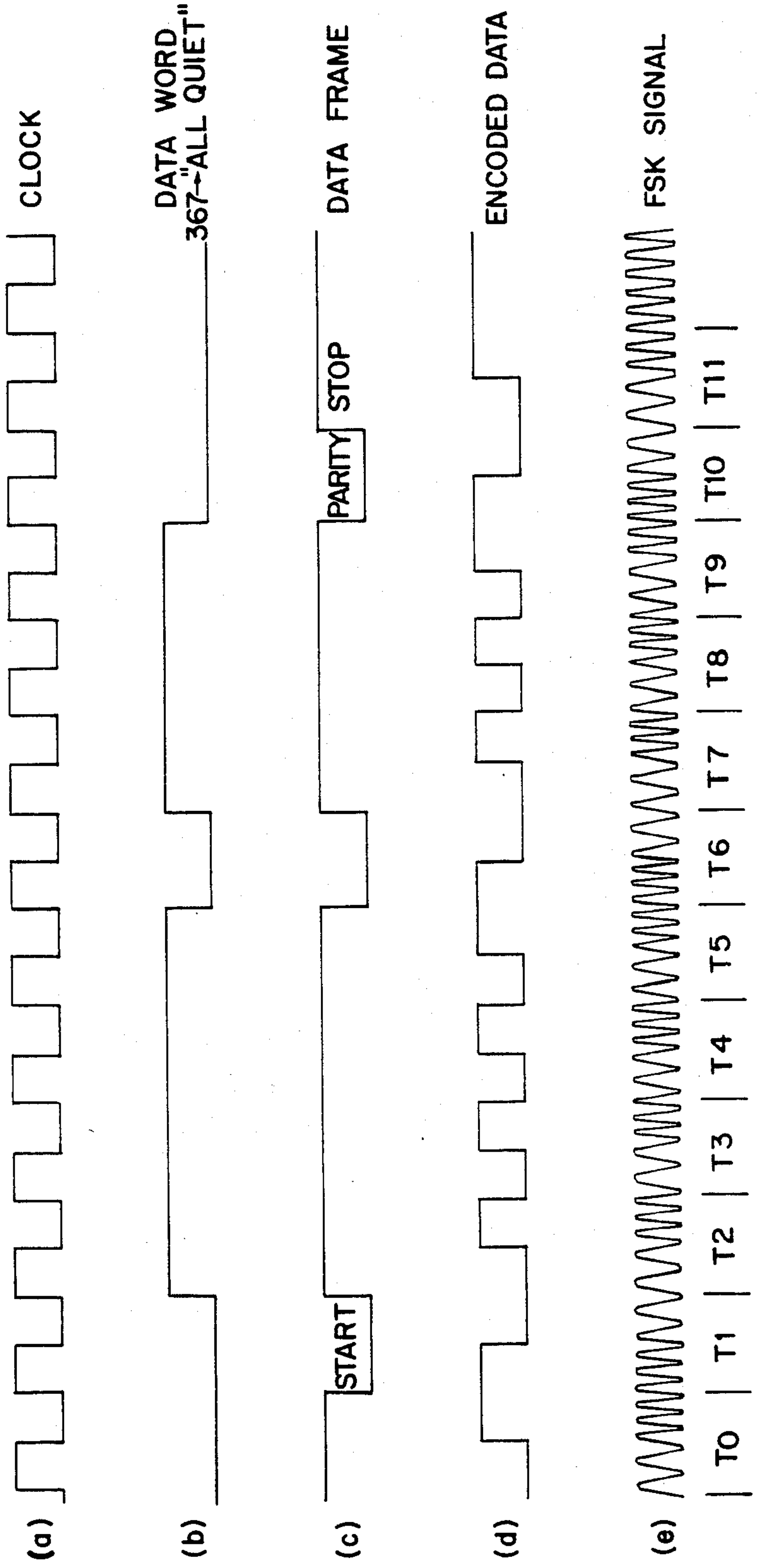

FIG. 3 illustrates the manner in which an 8 bit message is transmitted in the present system. The specific example illustrated is a command (ALL QUIET) issued from the headend to all subscriber alarm processors. The ALL QUIET command as well as the other commands utilized in the system is discussed in detail below.

FIG. 3*a* is the system clock at approximately 13.985 KHZ. The system clock is conveniently generated by binary division of a 3.58 color subcarrier signal which is generated using an available, mass produced color TV crystal.

FIG. 3*b* represents the command code 367 or 11 110 111 in binary code. The 8 bits of the command code occur in 8 time intervals, T2 through T9 with the most significant bit occurring first in time interval T2.

FIG. 3*c* shows the data frame format containing the command message. The data frame includes a start bit during time interval T1, and odd parity bit during time interval T10, and a stop bit during time interval T11.

FIG. 3*d* is a Manchester encoded signal wherein the clock signal of FIG. 3*a* is combined with the data frame signal of FIG. 3*c*. The Manchester encoded signal is generated by an exclusive or logic function between a clock (FIG. 3*a*) and the data frame (FIG. 3*c*). Note that the clock and data are now integrated in such manner that there is a waveform transition in the middle of each bit interval. An upward transition (from logic 0 to logic 1) in the middle of a bit interval indicates a logic 1, while a downward transition (from logic 1 to logic 0) indicates a logical 0.

FIG. 4*e* illustrates the actual signal encoding of the 8 bit word on the cable TV system. FSK modulation is used wherein a logic 1 corresponds to plus 75 KHZ above center frequency and logic 0 corresponds to minus 75 KHZ below center frequency. When the encoded data (FIG. 4*d*) is at a logical 1, the FSK signal (FIG. 4*e*) is of a first, higher frequency, and when the encoded data is logic 0, the FSK signal is of a 2nd lower frequency. The transition of the encoded data between 0 and 1 (and vice versa) is shaped to provide a smooth gradual transition so that the signal transitions of the FSK signal between high and low frequency is also relatively gradual. This premodulation wave shaping tends to prevent an unduly broad spectrum spread for the FSK signal.

With regard to communication channel frequency and bandwidth, reference is made to FIG. 4 which illustrates the preferred channel assignments to be used with the present system. The polling channel frequency is chosen from any conveniently available frequency in the standard FM band, i.e. from 88 to 108 MHZ. An unused space in the FM band can be found in most localities. Based on the system clock frequency and the difference between upper and lower FSK frequencies, a bandwidth of 400 KHZ at 40 db is anticipated.

The polling return channel and alarm channel frequencies are chosen from the T-9 video channel (17.75 to 23.75 MHZ) in the return spectrum. Again, bandwidth of the polling return channel and alarm channel are expected to be 400 KHZ at 40 db. Note that while the polling channel frequency in a given system is generally fixed, the polling return channel and alarm channel frequencies are selectable by headend command, as will be more clearly understood from the following detailed description of system commands.

GLOBAL COMMANDS

Global commands, shown in FIG. 5, have a format consisting of a single word 3 message.

INTER-RECORD GAP (IRG) is used as a system synchronizing signal. Both the headend alarm processor and the subscriber alarm processor may preceed a message transmission by transmitting 5 IRG codes.

ALL QUIET command causes all subscriber alarm processors to stop all upstream transmission on the alarm channel unless otherwise requested by another headend command. If an alarm condition existed prior to the ALL QUIET command, such alarm is stored for later transmission, or if no alarm was received prior to the ALL QUIET command, then the first alarm received after the ALL QUIET command is stored for later transmission.

ALL STAND ALONE command causes each subscriber alarm processor to sound local alarms only on the subscriber's premises but not to transmit alarms on the alarm channel. The ALL STAND ALONE command is distinguishable from the ALL QUIET command in that the ALL STAND ALONE command causes the last alarm condition received to be stored while the ALL QUIET command causes the first alarm condition received to be stored.

ALL SPEAK AGAIN command causes all subscriber alarm processors to transmit stored alarms again over the alarm channel. This command essentially cancels the ALL QUIET command and/or the ALL STAND ALONE command. Generally, regardless of whether or not a previous command was issued, the ALL SPEAK AGAIN command requests all subscriber alarm processors in the system to retransmit their stored alarm condition, if any, on the alarm channel.

RESTORE ORIGINAL FREQUENCY command causes all subscriber alarm processors to set the frequencies of the polling return channel and alarm channel to respective values as defined by data stored in the PROM of each respective subscriber alarm processor.

BATTERY TEST ON is used for a global battery test. Upon transmission of the BATTERY TEST ON command, all subscriber alarm processors switch over to battery power. The global battery test provides for actual operation of each subscriber's battery under simulated power fail conditions. The battery test is continued for a specified time duration (eg, 1 hour). If any battery failed during the test, the low battery alarm is transmitted from the respective subscriber unit to the headend. A local low battery alarm may also sound at the subscriber's premises indicating that the battery should be replaced. A battery failure during the global battery test causes the respective subscriber alarm processor to switch back to AC power, so that there is no interruption in security coverage. A battery that passes the global battery test therefore has a demonstrated capability to power the subscriber's unit for the specified time duration in the even AC power fails.

BATTERY TEST OFF command indicates to all subscriber alarm processors to terminate the global battery tests and return to normal AC power operation.

RESET is global command for resetting all subscriber alarm processors to a predetermined initial state.

ADDRESSABLE COMMANDS

Addressable commands shown in FIG. 6 have a format consisting of a word 3 command code followed by word 2, word 1, and word 0 which define an 18 bit subscriber address.

POLLING command polls individual addressed subscriber alarm processors. The addressed subscriber unit acknowledges the polling command by transmitting the word 0 portion of its address on the polling return channel. There is an alternate format for this command which increases the polling speed. The alternate format consists of a single word 0. In such case, a subscriber alarm processors utilize the previously transmitted word 2 and word 1 as the upper 12 bits of the address polled.

DIRECT VERIFY command requests the addressed subscriber alarm processor transmit an alarm message, if any alarm condition is stored, on the polling return channel. The format of the alarm message in response to a direct verify command is 5 IRG, word 2, word 1, word 0, followed by an alarm code indicating the type of alarm condition, and a checksum. This command is typically used to directly verify that an alarm received on the alarm channel did, in fact, originate at the addressed subscriber unit.

ALARM VERIFIED command clears the alarm storage of the addressed subscriber unit in order to permit that subscriber unit to process a new alarm. The ALARM VERIFIED command is typically used to clear an alarm condition after the alarm has been received and direct verified from the headend.

DISARM command turns off the intrusion alarm of the addressed subscriber unit.

LEARN PRIMARY CODE command, intended as an added level of access security, this command authorizes the subscriber to enter a new primary code. The primary code is used to program secondary codes for use by others. Programming of a new primary code is enabled only by this headend command.

ADDRESSABLE DATA COMMANDS

As shown in FIG. 7, the addressable data command group has a five word format. The first word (word 3) identifies the specific command code, the next three words (word 2, word 1 and word 0) define an 18 bit address, and the fourth word is a data word (word X).

TUNE POLLING RETURN CHANNEL command instructs the addressed subscriber unit to tune its polling return channel to a frequency defined by word X. The scale is 100 KHZ per bit, which provides a tuning range of 25.6 MHZ in 100 KHZ increments.

TUNE ALARM CHANNEL command instructs the addressed subscriber unit to tune its alarm channel to a frequency defined by word X.

GLOBAL DATA COMMANDS

This command group has two formats; a two word format and a three word format. FIG. 8 shows global data commands with a two word format. The first word (word 3) identifies the specific command. Depending upon the command type, the second word may be a word 2, word 1, or word 0, defining a 6 bit portion of an 18 bit address, or the second word can be a data word X.

GLOBAL TUNE ALARM CHANNEL command returns the alarm channel frequency used by all subscriber units to a new frequency as defined by the following data word X.

ADDRESS SEARCH 0 command, and the following command (ADDRESS SEARCH 1), are used to search through all the subscriber units in order to determine which subscriber unit has originated an unintelligible, or garbled, alarm message. The ADDRESS SEARCH 0 command requests that any subscriber unit detecting an alarm condition send its stored alarm code on the polling alarm channel, if the 6 bit address segment defined by following word 2 (or word 1 or word 0) matches the respective subscriber address segment, and the subscriber unit did not reply to the previous ADDRESS SEARCH 0 command.

ADDRESS SEARCH 1 command requests that any subscriber unit detecting an alarm condition send its stored alarm code on the polling return channel if the 6 bit address segment defined by word 2 (or word 1 or word 0) matches the respective subscriber address segment and the subscriber unit address did reply to the previous ADDRESS SEARCH 0 or ADDRESS SEARCH 1 command.

FIG. 9 shows a global data command with a three word format. The first word identifies the command, the second word is either a word 2, word 1, or word 0 defining a 6 bit portion of an 18 bit address, and the third word is a data word X.

GROUP TUNE POLLING RETURN CHANNEL command causes all subscriber units having an address that matches the following address word (word 2, or word 1 or word 0) to tune their respective polling return frequency to the following word X.

FIG. 10 is a table listing of the 8 bit alarm codes corresponding to various alarm conditions. Alarm ports 0 through 7 are indicated in their order of priority. Alarm code 0, the highest priority, indicates an intrusion alarm. Alarm code 1, the second highest priority, indicates a fire alarm. The next 6 codes in order of priority are defined by the user. Alarm codes 20, 40 and 100 correspond to medical, fire and police panic button alarms. Alarm code 200, 272 and 274 correspond to battery failure, tamper alarm and system disarm conditions respectively.

Figure 11:
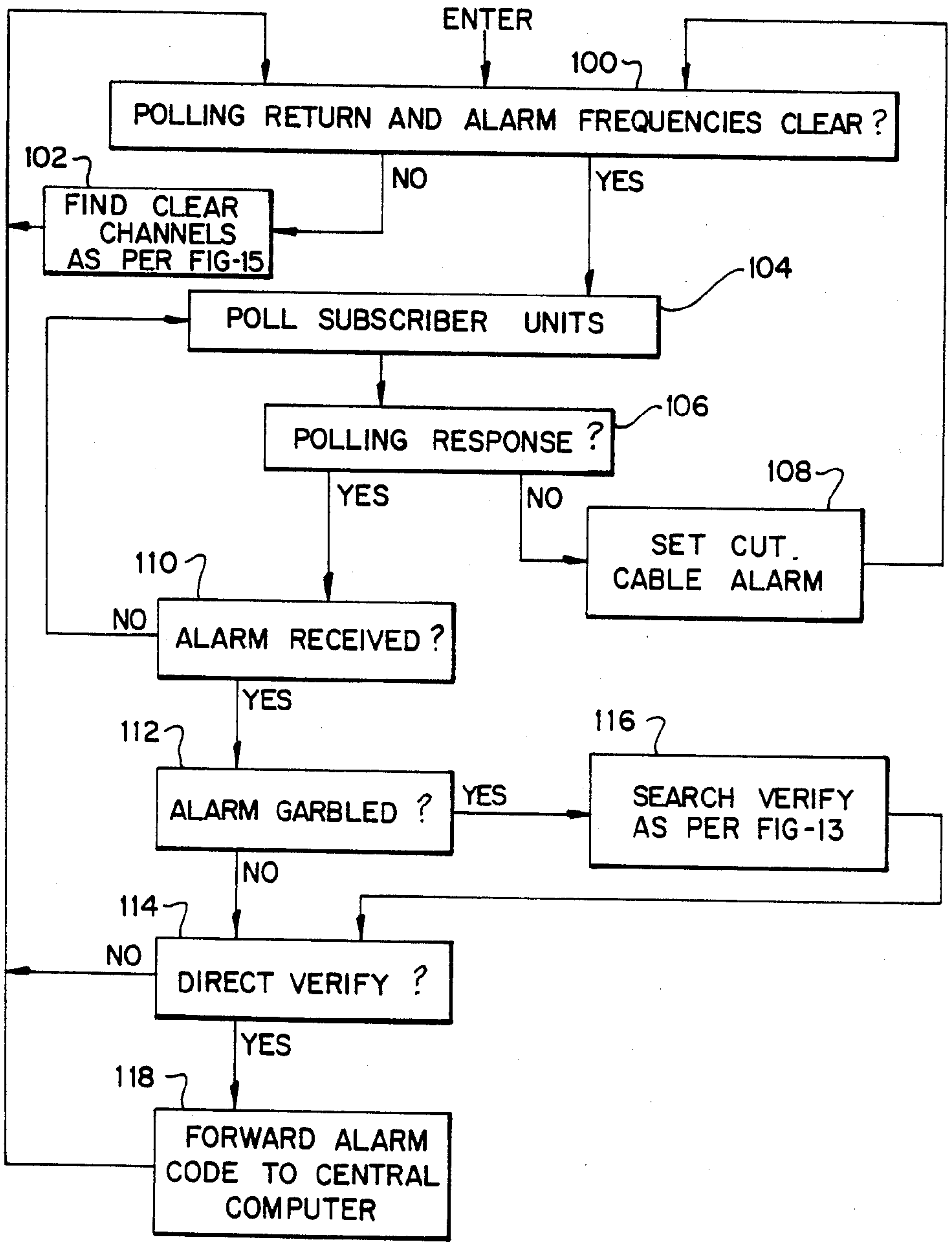
FIG. 11 is a program flow chart illustrating the normal polling and direct verify logic for the program embodied in the controller at the headend alarm processor of FIG. 1.

The program flow chart in FIG. 11 illustrates the normal polling and direct verify logic carried out by the headend alarm processor 20 (FIG. 1). In the following description, FIG. 11 is discussed in conjunction with the system block diagram of FIG. 1.

The program is entered in step 100 wherein the polling return and alarm channel frequencies are monitored to determine whether such channels are clear. A convenient criteria for deciding as to whether the channel frequencies are clear is to monitor the receiver squelch of respective polling receiver 16 and alarm receiver 18. If the respective squelch function is continuously open, then the respective channel is considered to be not clear indicating that a subscriber unit or other signal source is jamming that frequency.

If both the polling return frequency and the alarm channel frequency is clear, a polling command is sent to a subscriber address at step 104. If no polling response is received at step 106, then a cut cable alarm is set at step 108 corresponding to the address that has not answered the poll. The program then returns to check for clear channel frequencies at step 100.

In a typical situation for most polling messages, a polling response is received at step 106. Then the alarm receiver 18 is checked at step 110 to determine whether an alarm has been received. Alarm receiver 18 preferrably has its own microprocessor to decode the format of the incoming alarm message, and check such message for errors. If no alarm is received at step 110, then normal polling is continued at step 104.

When an alarm message is received at step 110, and no errors are indicated, e.g. the alarm message is not garbled, at step 112, the system attempts to directly verify the address of the alarming unit at step 114. If the alarm message can be directly verified at step 114, the alarm code and the subscriber address originating the alarm code is forwarded to the central computer at step 118. After forwarding the alarm code, or if the alarm message cannot be directly verified, the program returns to the beginning at step 100.

If garbling of the alarm message, i.e. an error, is indicated at step 112, a search verify routine is entered at step 116. The search verify routine is a rapid search routine that can identify the subscriber alarm unit that originated a garbled message.

Figure 12:
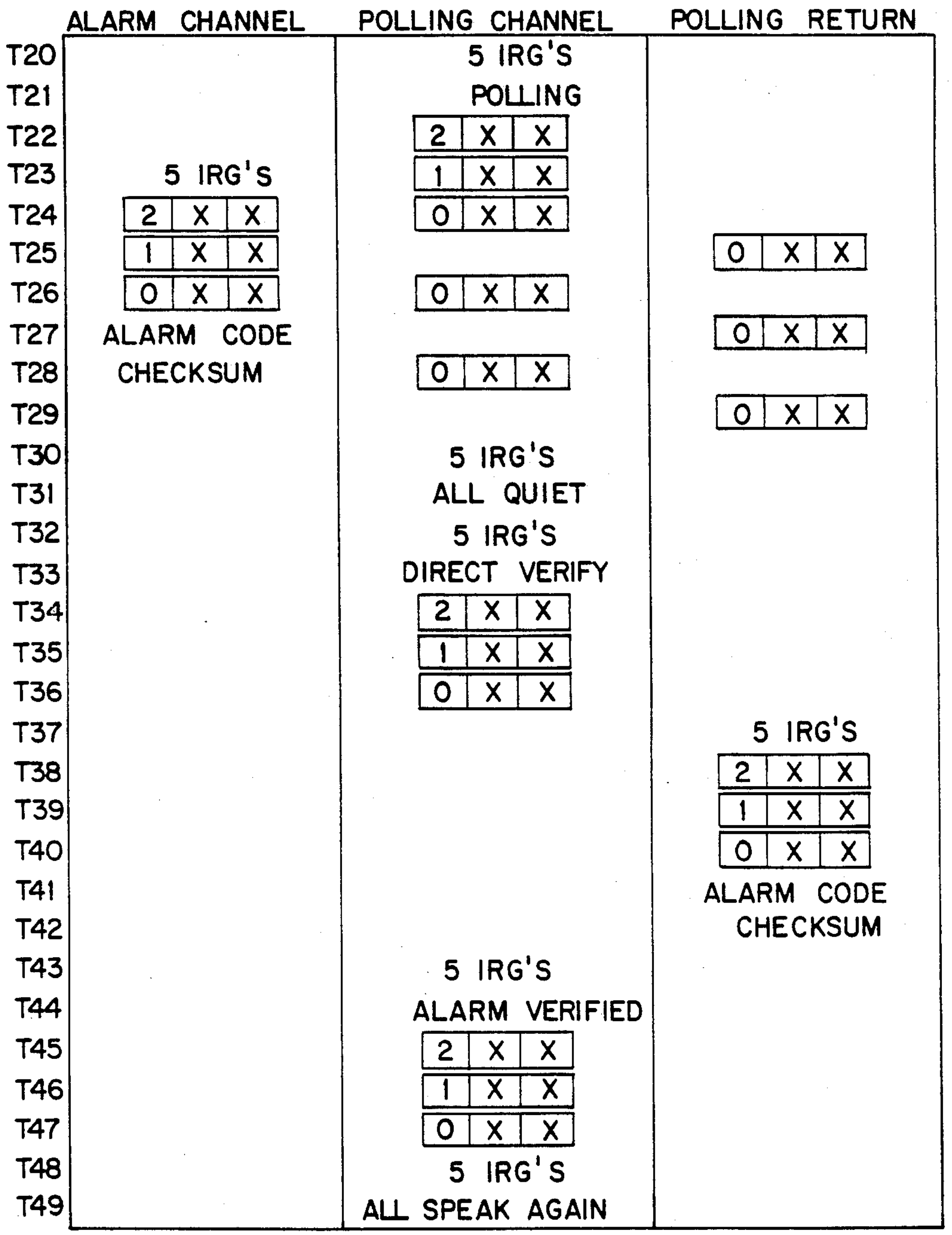
FIG. 12 illustrates a typical command sequence for normal polling and direct verification transmitted from the headend alarm processor, and the corresponding respective return sequences received from the subscriber alarm processors for the flow chart of FIG. 11.

FIG. 12 illustrates the command sequence on the three data channels, i.e. the alarm channel, the polling channel, and the polling return channel during a typical polling sequence. The left hand side of FIG. 12 represents time intervals, T20 through T49. Polling is initiated on the polling channel by sending 5 IRG commands during T20, followed by a POLLING command during T21 and an 18 bit address during T22, T23, and T24. A polling response from the addressed subscriber unit is received on the polling return channel during T25. The headend continues polling to the next address by sending a new word 0 during T26. The addressed subscriber unit responds on the polling return channel at T27 and so on for T28 and T29, or until all the word 0 addresses (64 subscriber units) have been polled. The polling sequence continues by transmitting 5 IRG's, a POLLING command followed by word 2 and word 1, and word 0.

During polling, an alarm message is indicated on the alarm channel from T23 to T28. The alarm message format consists of 5 IRG's followed by word 2, word 1, and word 0 defining the address of the alarming unit, followed by an alarm code, followed by a checksum corresponding to the least significant bits of the sum of all words in the alarm message.

The receipt of an alarm message interrupts normal polling on the polling channel. From T30 to T36 a direct verify sequence is transmitted. The direct verify sequence consists of 5 IRG's followed by an ALL QUIET command, then 5 IRG's, followed by a DIRECT VERIFY command, followed by a word 2, a word 1 and word 0 defining the address of the alarming subscriber unit.

The alarming subscriber unit then responds to the direct verify sequence during time interval T37 through T42. The response to the direct verify sequence is transmitted on the polling return channel. The direct verify response consists of 5 IRG's followed by a word 2, word 1 and word 0 defining the address of the alarming subscriber unit followed by the alarm code and a checksum.

The headend controller then verifies (acknowledges) that an alarm has been properly received at the headend by transmitting an alarm verified sequence during time intervals T43 through T49. The alarm verified sequence consists of 5 IRG's followed by an ALARM VERIFIED command, followed by the address of the alarming subscriber unit. The alarm verified message clears the alarm at the subscriber unit and indicates that the alarm has been properly received and acknowledged by the headend. The alarm verified sequence is followed by 5 IRG's and an ALL SPEAK AGAIN command, which readies the system to process the next alarm.

Figure 13:
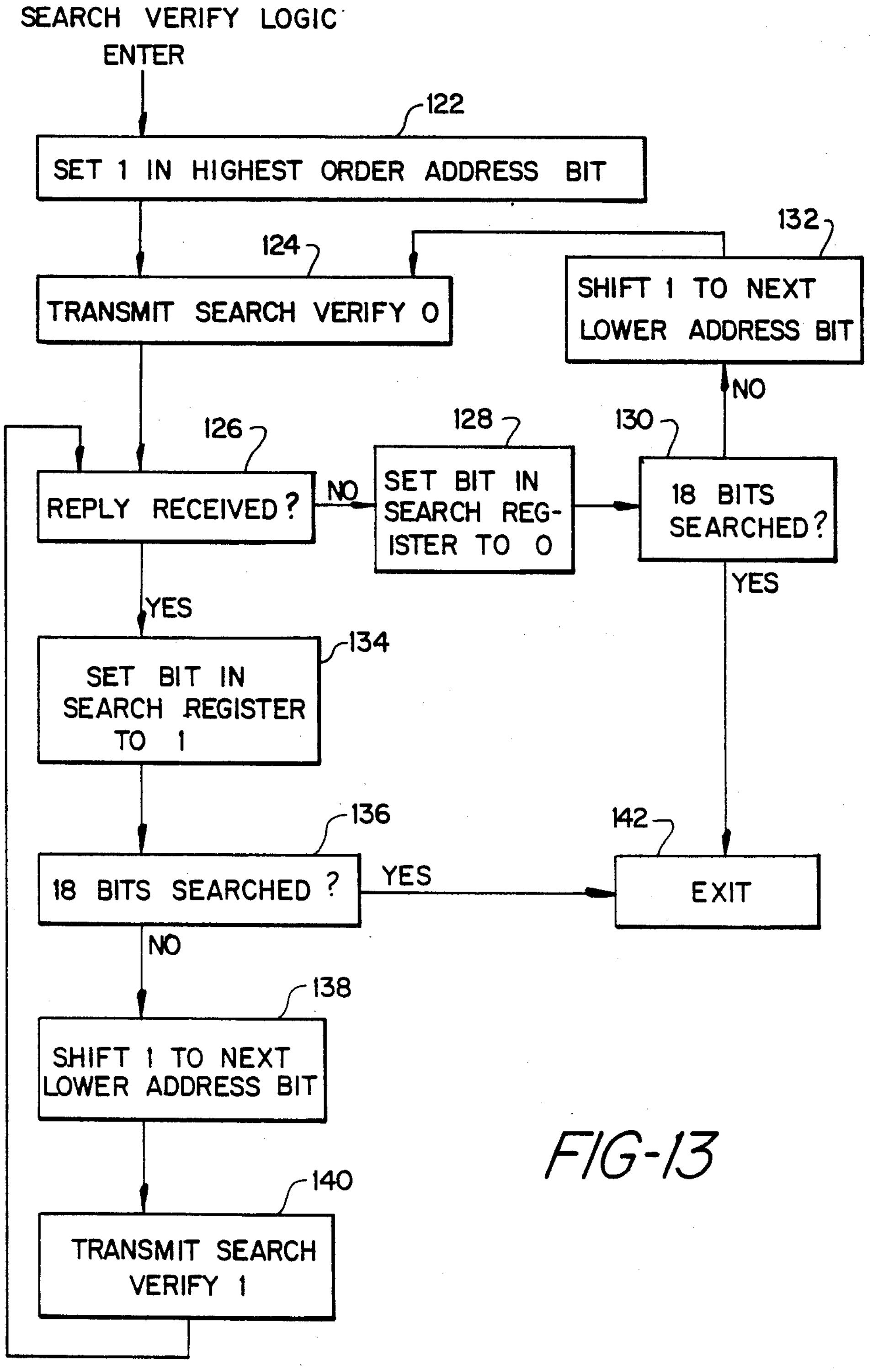
FIG. 13 is a program flow chart illustrating the search verify logic for the program flow chart of FIG. 11.

FIG. 13 is a program flow chart for the search verify logic 116 indicated in FIG. 11. The search verify routine is entered after a garbled message is received on the alarm channel. A garbled alarm is defined as an alarm message containing a parity error, checksum error or any other formatting error such as an illegal alarm code. Garbled alarms may be caused by noise on the alarm channel, or an attempt by two subscriber alarm processors to simultaneously transmit respective alarm messages. Since alarm messages represent emergency situations, garbled alarms cannot be ignored. The search verify routine is designed to quickly identify the address of a subscriber alarm processor that originated a garbled alarm message. In order to perform this function, the ADDRESS SEARCH 0 and ADDRESS SEARCH 1 commands are used.

Initially, a logic 1 is set in the highest order address bit of an address register at step 122. That is, a word 2 is assembled with bit B5 equal to 1 and bits B0 through bit B4 equal to logic 0. Then, ADDRESS SEARCH 0 is transmitted at step 124. If no reply is received at step 126, then a 0 is set in the corresponding bit of a search register at step 128. If all 18 bits have not been searched at step 130, then the 1 is shifted to the next lowest address bit at step 132 and another ADDRESS SEARCH 0 command is transmitted at step 124. If no reply is ever received, then a search register address of 0 will result after 18 bits have been searched. The program exits at step 142. A search result of 0 indicates that no subscriber unit has an alarm condition to send to the headend.

If a reply is received at step 126, a 1 is set in the corresponding bit of the search register at step 134. If all 18 bits have not been searched at step 136 then a 1 bit is shifted to the next lower address bit and an ADDRESS SEARCH 1 command is transmitted at step 140. So long as a reply is received at step 126, 1 bit is set in the corresponding bit of the search register at step 134.

Thus, a search address is built having a contents corresponding to the highest order address of the subscriber unit that has an alarm to be transmitted to the headend. If the garbled alarm message was caused by a collision of two subscriber units sending an alarm message at the same time, then the search verify logic will identify the higher address subscriber unit. An ALL SPEAK AGAIN command may be transmitted to allow the low order subscriber unit to send messages on the alarm channel. Furthermore, if more than two subscriber alarm units send simultaneous alarm messages, the search verify logic can be used to identify the address of each respective subscriber unit.

FIG. 14 illustrates the typical command sequence for the search verify routine on the respective alarm channel, polling channel and polling return channel. The left hand side of the table in FIG. 14 represents time intervals T59 through T81.

A garbled alarm is received during time interval T59. The search verify sequence beings at T60 with the transmission of 5 IRG's. The highest order address bit is searched first by transmitting ADDRESS SEARCH 0 command followed by a word 2 with a 1 in the most significant address bit (B5). Since no reply is received on the polling return channel, ADDRESS SEARCH 0 command is again transmitted but this time followed by a word 2 with a 1 in the next most significant bit (B4). This process is continued until an alarm code reply is received on the polling return channel as indicated during T68.

The search verify sequence continues at T69, but since an alarm reply (the alarm code) was previously received on the polling return channel, an ADDRESS SEARCH 1 command is transmitted with a 1 in the next most significant bit (B2). Since an alarm code is received on the polling return channel at T72, a subsequent ADDRESS SEARCH 0 is transmitted with a 1 in the next most significant bit (B1). So long as alarm codes are received on the polling return channel responsive to the ADDRESS SEARCH 1 command, this process is repeated.

When no alarm code is received on the polling return channel, responsive to an ADDRESS SEARCH 1, the search verify sequence then transmits successive ADDRESS SEARCH 0 commands with a 1 in successive next most significant bit positions. It can be seen therefore that after 18 iterations (one iteration for each bit of the 18 bit address), the address of the alarming subscribers unit can be determined. After the address is determined, the headend controller can verify the alarm by a DIRECT VERIFY command which addresses the specific subscribers unit.

Alarm messages on the alarm channel are transmitted somewhat asynchronously. That is, whenever a subscriber alarm processor detects an alarm condition, the alarm message is assembled for transmission on the alarm channel.

Figure 15:
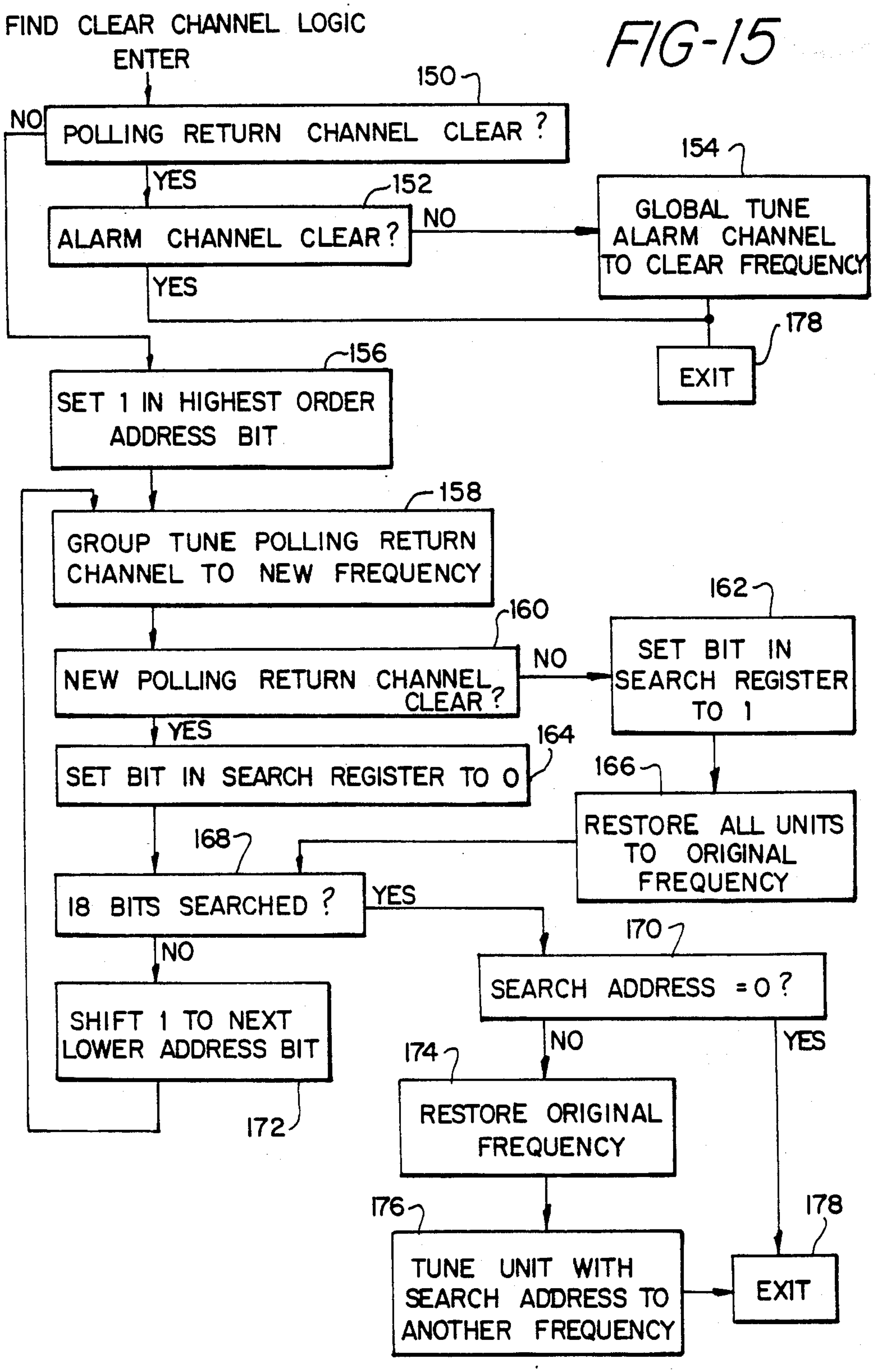
FIG. 15 is a program flow chart illustrating the logic to find clear channels for the program flow chart of FIG. 11.

The program flow chart in FIG. 15 illustrates the logic used by the headend controller to find clear channel frequencies (step 102 in FIG. 11) for the polling return channel and the alarm channel. The primary purpose of the find clear channel logic is to eliminate system malfunction (and resulting loss of security coverage) when one subscriber alarm unit transmits interferring signals on either the alarm channel of the polling return channel.

The find clear channel program is entered at step 150 wherein the polling return channel frequency is checked. If the polling return channel frequency is clear then the alarm channel frequency is checked at step 152. A convenient criteria for determining when channel frequencies are no longer clear is to monitor receiver squelch. Also error statistics (e.g. parity and checksum errors) may be accumulated to indicate random noise on one or both channels. If both channels are clear, then a program exit is provided at step 178.

Assume that the alarm channel frequency is not clear due to a malfunctioning subscriber unit transmitting on the alarm channel frequency. Now since each subscriber alarm processor contains a single phase locked loop (PLL) in its respective frequency synthesizer, the address of the malfunctioning unit will show up in the polling sequence as a cut cable alarm. Also it is unlikely that such malfunctioning unit will respond to a change in alarm channel frequency. Therefore, when a GLOBAL TUNE ALARM CHANNEL command is transmitted at step 154 to all the subscriber alarm processors in the system, it is not likely that the malfunctioning unit will change its alarm channel frequency. Therefore in nearly all failure modes, the GLOBAL TUNE ALARM CHANNEL command will move all functioning boxes to a clear frequency. In the rare event that the malfunctioning subscriber unit does change to the new alarm frequency, such malfunctioning unit may be individually tuned to another frequency.

If the polling return frequency is not clear at step 150 the program proceeds to determine the address of the malfunctioning unit. A 1 is set in the highest order address bit of an address register in step 156. A GROUP TUNE command is transmitted which causes all subscriber units with a 1 in their most significant bit to tune to a new frequency at step 158. The new polling return channel is then checked. If the new polling return channel is clear, a 0 is set in the most significant bit of a search register at step 164. At step 156 the number of bits that have been searched is checked. If 18 bits have not been searched, a 1 is shifted to the next lower address bit in the address register at step 172. A GROUP TUNE command is again transmitted at step 156, whereupon all subscriber units with a 1 in their next most significant bit are tuned to a new channel frequency. The new channel frequency is again checked at step 160. If after any GROUP TUNE command, the new polling return channel is no longer clear, then a 1 is set in the search register corresponding to the 1 set in the respective bit of the address register at step 162. Then all units are returned to the original frequency at step 166 by the use of a RESTORE ORIGINAL FREQUENCY command. The program then checks to see whether all 18 bits have been searched at step 168. After 18 iterations, the program checks the contends of the search address register at step 150. If the search address is 0, then the new channel frequency is clear, that all functioning units are now on the new frequency, and that the malfunctioning unit has been left on the previous frequency. The address of the malfunctioning unit will be identified as a cut cable alarm on the next polling cycle. The program then exits at 178. However, if the search register address is not 0, and the contents of the search register indicate the address of the malfunctioning unit. At step 174 the original frequency is restored for all units, and the malfunctioning unit (having an address corresponding to contents the search address register) is turned to another frequency at step 176.

What is claimed is:

1. A subscriber security apparatus for use in conjunction with a cable communication system and headend apparatus including means for transmitting first and second command messages modulating a first radio frequency signal, and means for receiving from said subscriber security apparatus a polling return message modulating a second radio frequency signal and an alarm message modulating a third radio frequency signal, said subscriber security apparatus having an address associated therewith, said subscriber security apparatus comprising:

means for receiving said first and second command messages;

frequency control means for setting the respective frequencies of said second and third radio frequency signals;

means responsive to said means for receiving said first command message including an address specified in said first command message, and coupled to said frequency control means for setting the frequency of said second radio frequency signal to a value specified in said first command message, when said address of said subscriber security apparatus matches said address specified in said received first command message; and means responsive to said means for receiving said second command message including an address specified in said second command message, and coupled to said frequency control means, for setting the frequency of said third radio frequency signal to a value specified in said second message, when said address of said subscriber security apparatus matches said address specified in said received second command message.

2. A subscriber security apparatus in accordance with claim 1 for use in conjunction with a cable communications system and headend apparatus further including means for transmitting a third command message modulating said first radio frequency signal, said subscriber security apparatus further comprising:

means for receiving said third command message; and means responsive to said means for receiving said third command message, and coupled to said frequency control means, for setting the respective frequency of said second and third radio frequency signals to respective predetermined values.

3. A subscriber security apparatus in accordance with claim 2, for use in conjunction with a cable communications system and headend apparatus including means for transmitting a fourth command message including a frequency value specified in said fourth command message, and modulating said first radio frequency signal, said subscriber security apparatus further comprising:

means for receiving said fourth command message; and means responsive to said means for receiving said fourth command message, and coupled to said frequency control means, for setting the frequency of said third radio frequency signal to said frequency value specified in said fourth command message.

4. An alarm system comprising:

a cable communication system;

a plurality of subscriber security apparatus each of said subscriber security apparatus having a respective address associated therewith; and a headend apparatus including means for transmitting first and second command messages modulating a first radio frequency signal, and means for receiving from each of said subscriber security apparatus a respective polling return message modulating a second radio frequency signal, and a respective alarm message modulating a third radio frequency signal;

wherein each of said respective security apparatus further includes, means for receiving said first and second command messages;

frequency control means for setting the respective frequencies of said second and third radio frequency signals;

means responsive to said means for receiving said first command message including an address specified in said first command message, and coupled to said frequency control means for setting the frequency of said second radio frequency signal to a value specified in said first command message, when said address of said subscriber security apparatus matches said address specified in said received first command message; and means responsive to said means for receiving said second command message including an address specified in said second command message, and coupled to said frequency control means, for setting the frequency of said third radio frequency signal to a value specified in said second message, when said address of said subscriber security apparatus matches said address specified in said received second command message.

5. An alarm system in accordance with claim 4 wherein said headend apparatus further includes means for transmitting a third command message modulating said first radio frequency signal, and each of said subscriber security apparatus further comprises:

means for receiving said third command message; and means responsive to said means for receiving said third command message, and coupled to said frequency control means, for setting the respective frequency of said second and third radio frequency signals to respective predetermined values.

6. An alarm system in accordance with claim 5, wherein said headend apparatus includes means for transmitting a fourth command message including a frequency value specified in said fourth command message, and modulating said first radio frequency signal, and each of said subscriber security apparatus further comprises;

means for receiving said fourth command message; and means responsive to said means for receiving said fourth command message, and coupled to said frequency control means, for setting the frequency of said third radio frequency signal to said frequency value specified in said fourth command message.

* * * * *

UNITED STATES PATENT AND TRADEMARK OFFICE
CERTIFICATE OF CORRECTION

PATENT NO. : 4,494,111

DATED : January 15, 1985

INVENTOR(S) : Joseph D. Rocci, et al.

It is certified that error appears in the above-identified patent and that said Letters Patent is hereby corrected as shown below:

On the title page the inventors should read:

--(75) Inventors: Joseph D. Rocci, Lansdale;
Stephen E. Crook, Horsham;
Marc Kauffman, Elkins Park,
Donald E. Groff, Hatfield, all of Pa.

Signed and Sealed this

*Thirtieth* Day of *July 1985*

[SEAL]

*Attest:*

DONALD J. QUIGG

*Attesting Officer* *Acting Commissioner of Patents and Trademarks*